(12) United States Patent
Hutchins et al.

(10) Patent No.: US 6,390,136 B1
(45) Date of Patent: May 21, 2002

(54) METHOD OF PRODUCING A HOSE/CLAMP COMBINATION AND A HOSE/CLAMP ASSEMBLY PRODUCED THEREBY

(75) Inventors: Thomas Goodsell Hutchins, Uniontown, OH (US); Arthur Joseph Culham, Nottawa (CA)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/674,570

(22) PCT Filed: May 21, 1998

(86) PCT No.: PCT/US98/10416

§ 371 Date: Oct. 30, 2000

§ 102(e) Date: Oct. 30, 2000

(87) PCT Pub. No.: WO99/60298

PCT Pub. Date: Nov. 25, 1999

(51) Int. Cl.[7] ............................. F16L 11/04; F16L 21/00
(52) U.S. Cl. .................... 138/109; 138/99; 156/66; 156/383; 285/236; 285/242; 285/252
(58) Field of Search .................. 138/109, 99; 285/236, 285/242, 245, 252, 253, 254, 259, 365, 407; 156/66, 70, 214, 383

(56) References Cited

U.S. PATENT DOCUMENTS

| 3,593,502 A | * | 7/1971 | Pelosi, Jr. ................... 285/236 |
| 4,207,918 A | * | 6/1980 | Burns et al. ................ 138/178 |
| 4,520,952 A | * | 6/1985 | Wahl et al. ................. 285/236 |
| 5,002,094 A |   | 3/1991 | Brovont ...................... 138/109 |
| 5,185,913 A | * | 2/1993 | Campo et al. .............. 285/253 |
| 5,234,233 A | * | 8/1993 | Fix .............................. 285/238 |
| 5,388,321 A | * | 2/1995 | Farrell ........................ 285/242 |
| 5,456,784 A | * | 10/1995 | Logdill et al. .............. 285/252 |
| 5,917,148 A | * | 6/1999 | Woehl et al. ............... 285/252 |

FOREIGN PATENT DOCUMENTS

EP  0 375 482 A  6/1990

* cited by examiner

Primary Examiner—James Hook
(74) Attorney, Agent, or Firm—Nancy T. Krawczyk

(57) ABSTRACT

A hose/clamp combination wherein the clamp is oriented axially and circumferentially in its radially open position and held in place by a glued fabric overlay.

2 Claims, 2 Drawing Sheets

METHOD OF PRODUCING A HOSE/CLAMP COMBINATION AND A HOSE/CLAMP ASSEMBLY PRODUCED THEREBY

FIELD OF THE INVENTION

This invention relates to hose/clamp assemblies. More particularly, it relates to a hose clamp which is held in its radially expanded or open position, located and oriented around a hose and secured to a hose.

BACKGROUND OF THE INVENTION

Various attempts have been made in the past to pre-assemble hose clamps on hose. See, for example, U.S. Pat. No. 5,002,094 which employs a less than circumferential band of rubber which must be molded and vulcanized over a portion of the clamp. It is felt that this arrangement restricts the circumferential expansion of the hose and, thus, its assemblability over nipples in its end-use applications such as radiator and heater hoses in motor vehicle manufacturing. U.S. Pat. No. 5,297,821 utilizes a preformed or molded fastening member which is glued to the hose to retain the clamp to the hose. It is felt that the fastening member adds to the cost of the assembly. U.S. Pat. No. RE 35,253 utilizes a single spot of adhesive to attach the clamp to a hose. Lack of compatibility of the adhesive between the metal clamp and the rubber hose has resulted in the failure of the bond.

There was, therefore, a need for a hose/clamp assembly which did provide a positive retention of the clamp on the hose at a predetermined location and orientation without requiring expensive molded or extruded devices or devices which restricted the expansion of the hose.

SUMMARY OF THE INVENTION

In accordance with the practice of the present invention, there is provided a hose/clamp combination comprising:
 a) a hose;
 b) an annular hose clamp, having an aperture therein, in its radially expanded open position placed around the hose in a predetermined axial and circumferential orientation; and
 c) a pre-glued fabric overlay located across the aperture in the clamp and overlying the portions of the hose on each side of the clamp.

There is also provided a method of producing a hose/clamp combination comprising the steps of:
 a) providing a hose clamp with an aperture therein;
 b) providing a hose;
 c) orienting the clamp axially and circumferentially over and end of the hose;
 d) providing an overlay of fabric to which a glue has been applied;
 e) applying the fabric overlay to the hose across the aperture in the clamp and into the aperture; and
 f) holding the fabric in place until the glue sets.

DESCRIPTION OF THE INVENTION

Figure 1:
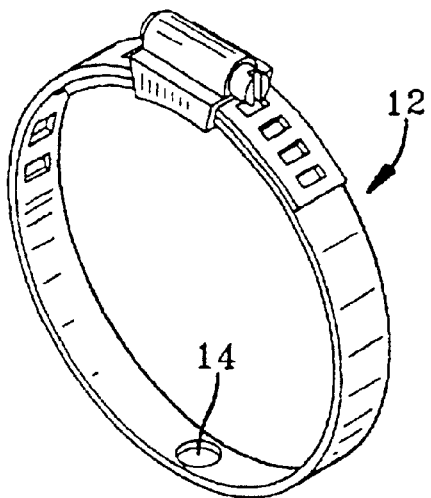
FIG. 1 is a perspective view of a typical worn drive clamp which can be used in the invention.
Figure 2:
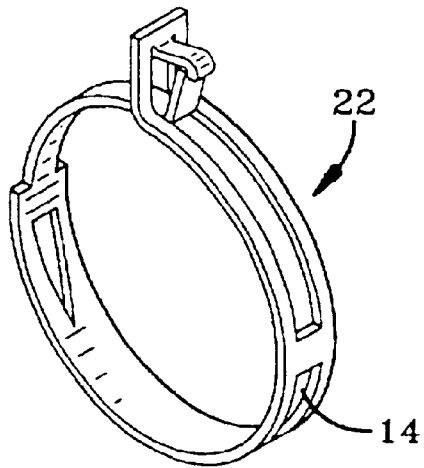
FIG. 2 is a perspective view of a typical constant tension clamp which can be used in the invention.
Figure 3:
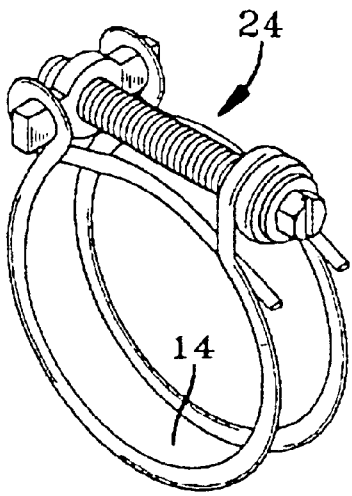
FIG. 3 is a perspective view of a typical two-wire clamp which can be used in the invention.
Figure 4:
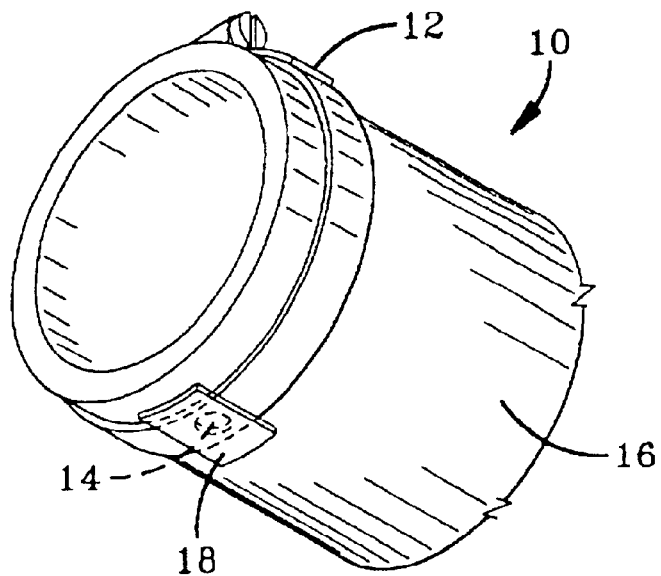
FIG. 4 is a perspective view of a typical hose/clamp combination of the present invention.
Figure 5:
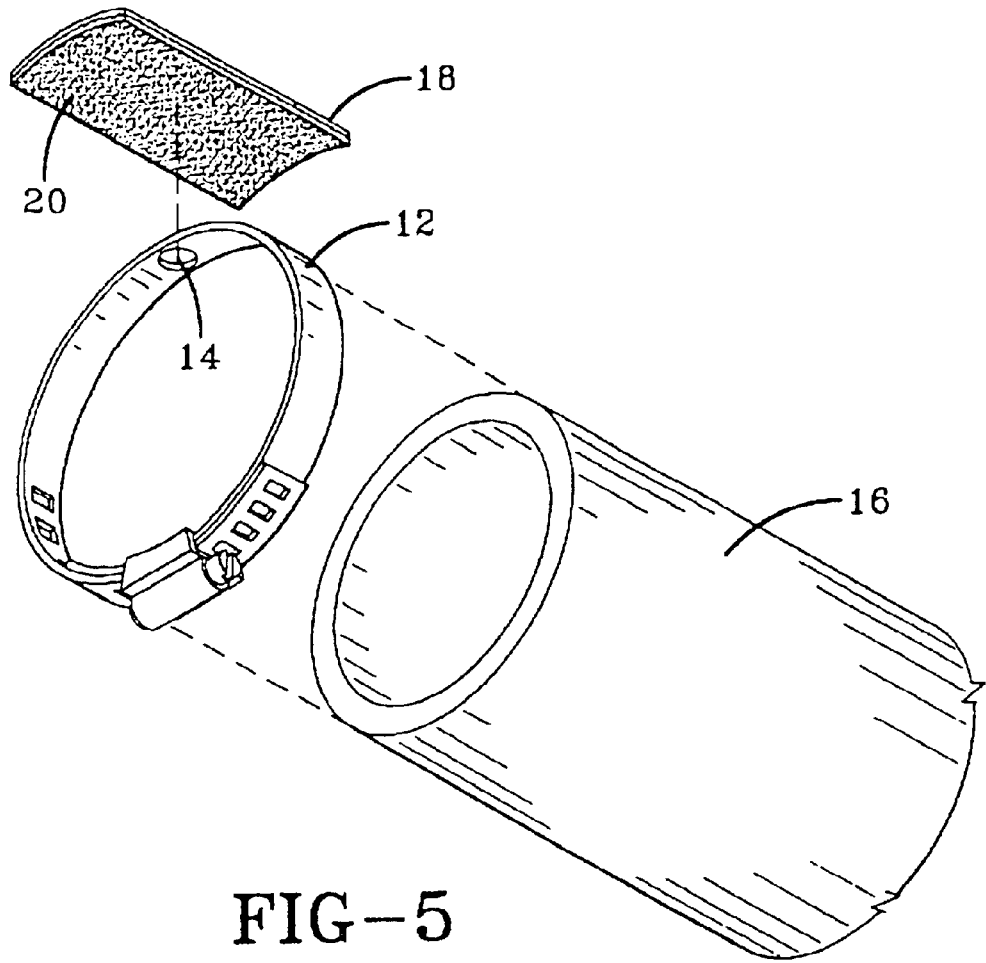
FIG. 5 is a perspective, blown apart view of the components of the present invention.

FIGS. 1, 2 and 3 represent typical hose clamps which can be used in the practice of this invention. All hose clamps 12, 22, 24 have apertures which allow for the fabric overlay 18 (FIGS. 4 AND 5) to contact the hose 16 through the apertures 14. The clamps 12, 22, 24, in their radially expanded condition are placed over the hose 16 and oriented axially and circumferentially. The glue 20, which can be a cyanoacrylate, epoxy, etc., is applied to the fabric overlay 18 and the fabric overlay is applied to the hose 16 over the clamp 12, 22, 24 at the point of the aperture 14 in order to contact the hose 16 through the aperture 14 and provide a chemical bond.

The fabric 18 can be woven or non-woven. It can be a leno or mock leno or square woven. The material can be cotton, rayon, polyester, nylon or any material which is bondable with the glue.

It can be appreciated that the glue 20 can also be applied directly to the hose 16 and clamps 12, 22, 24 prior to applying the fabric overlay 18; however, we prefer to apply it to the fabric overlay in order to avoid the unsightly appearance of dried glue beyond the boundary of the fabric overlay and to ensure that the ends of the overlay are well bonded.

While certain representative embodiments and details have been shown for the purpose of illustrating the invention, it will be apparent to those skilled in this art that various changes and modifications may be made therein without departing from the spirit or scope of the invention.

What is claimed is:
1. A hose/clamp combination comprising:
 a. a hose (16);
 b. an annular hose clamp (12) having an aperture (14) therein in its radially expanded open position, placed around the hose (16) in a predetermined axial and circumferential orientation; and
 c. a pre-glued fabric overlay (18) located across the aperture (14) in the clamp (12), bonding to portions of the hose through the aperture (14) and overlying portions of hose (16) on each side of the clamp (12).
2. A method of producing a hose/clamp combination comprising the steps of:
 a. providing a hose clamp (12) with an aperture (14) therein;
 b. providing a hose (16);
 c. orienting the clamp (12) axially and circumferentially over an end of the hose (16);
 d. providing a strip of fabric overlay (18) to which a glue has been applied;
 e. applying the fabric overlay (18) to the hose (16) over the clamp (12) at the point of the aperture (14); and
 f. holding the fabric (18) in place until the glue sets and a bond is formed between the fabric overlay (18) and hose portion at the point of the aperture (14).

* * * * *